(12) United States Patent
Feng et al.

(10) Patent No.: US 11,469,926 B2
(45) Date of Patent: Oct. 11, 2022

(54) METHOD FOR TRANSMITTING SIGNALS AND CORRESPONDING TERMINALS, AND BASE STATIONS

(71) Applicant: NTT DOCOMO, INC., Tokyo (JP)

(72) Inventors: Dongbo Feng, Beijing (CN); Xiangming Li, Beijing (CN); Neng Ye, Beijing (CN); Wenjia Liu, Beijing (CN); Xiaolin Hou, Beijing (CN); Runxin Wang, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 82 days.

(21) Appl. No.: 16/981,842

(22) PCT Filed: May 11, 2018

(86) PCT No.: PCT/CN2018/086470
§ 371 (c)(1),
(2) Date: Sep. 17, 2020

(87) PCT Pub. No.: WO2019/213934
PCT Pub. Date: Nov. 14, 2019

(65) Prior Publication Data
US 2021/0099326 A1    Apr. 1, 2021

(51) Int. Cl.
*H04L 25/02* (2006.01)
*H04L 5/00* (2006.01)
*H04W 24/10* (2009.01)

(52) U.S. Cl.
CPC .......... *H04L 25/0204* (2013.01); *H04L 5/005* (2013.01); *H04L 5/0073* (2013.01); *H04W 24/10* (2013.01)

(58) Field of Classification Search
CPC ... H04L 25/0204; H04L 5/005; H04L 5/0073; H04L 25/0202; H04W 24/10
See application file for complete search history.

(56) References Cited

U.S. PATENT DOCUMENTS

2015/0304080 A1    10/2015 Yi et al.
2018/0069652 A1*   3/2018 Yamamoto ............ H04L 1/0009
(Continued)

FOREIGN PATENT DOCUMENTS

CN    103326971 A    9/2013
CN    105357160 A    2/2016
(Continued)

OTHER PUBLICATIONS

International Search Report issued in PCT/CN2018/086470 dated Jan. 30, 2019 (2 pages).

*Primary Examiner* — Deepa Belur
(74) *Attorney, Agent, or Firm* — Osha Bergman Watanabe & Burton LLP

(57) ABSTRACT

Provided are a method for transmitting signals and corresponding terminals, and base stations, where the method for transmitting signals is performed by a terminal in a communication system. The method includes determining, whether to transmit an additional reference signal to a base station in the communication system according to information on channel conditions of the terminal; transmitting a main reference signal to the base station, where the main reference signal is used for channel estimation between the terminal and the base station; and when determining to transmit an additional reference signal to the base station, transmitting an additional reference signal to the base station according to configuration information of the additional reference signal.

20 Claims, 5 Drawing Sheets

(56) References Cited

U.S. PATENT DOCUMENTS

| | | | |
|---|---|---|---|
| 2018/0139640 A1* | 5/2018 | Chae | H04B 17/318 |
| 2018/0167932 A1* | 6/2018 | Papasakellariou | H04W 72/0413 |
| 2019/0386801 A1* | 12/2019 | Ren | H04L 5/0051 |
| 2020/0154400 A1* | 5/2020 | Byun | H04L 5/00 |
| 2021/0143961 A1* | 5/2021 | Saito | H04L 5/0051 |

FOREIGN PATENT DOCUMENTS

| | | | |
|---|---|---|---|
| CN | 105611639 A | 5/2016 | |
| WO | WO-2017015813 A1 * | 2/2017 | H04W 72/12 |

* cited by examiner

METHOD FOR TRANSMITTING SIGNALS AND CORRESPONDING TERMINALS, AND BASE STATIONS

TECHNICAL FIELD

The present disclosure relates to a field of mobile communication, and in particular, to a method for transmitting signals and corresponding user terminals and base stations.

BACKGROUND

In order to reduce signaling overhead, it has been proposed to use a grant-free uplink for information transmission in a Machine Type Communication (MTC) system. In this transmission manner, a user terminal may transmit information to a base station without the grant of the base station. Therefore, a plurality of user terminals may transmit information to the base station simultaneously.

In the MTC system, the user terminal transmits an uplink reference signal, for example a Demodulation Reference Signal (DMRS), to the base station, so that the base station performs channel estimation according to the uplink reference signal to detect and demodulate information transmitted by the user terminal. However, since the number of patterns of the uplink reference signals is limited, the plurality of user terminals may select the same uplink reference signal. Therefore, a case of the plurality of user terminals transmitting the same uplink reference signal to the base station simultaneously may exist. In this case, collisions among the uplink reference signals transmitted by the plurality of user terminals may happen, thereby causing interferences among the plurality of user terminals and reducing system performance of the communication system.

In order to reduce collisions among the uplink reference signals, a method of the base station extending the patterns of the uplink reference signals has been proposed. In this method, the base station may extend the patterns of the uplink reference signals and notify the user terminal of the extended patterns of the uplink reference signals. However, this leads to additional signaling overhead and a waste of transmission resources.

SUMMARY OF THE INVENTION

According to one aspect of the present disclosure, a method for transmitting signals performed by a user terminal in a communication system is provided. The method includes: determining whether to transmit an additional reference signal to a base station in the communication system according to information on channel conditions of the user terminal; transmitting a main reference signal to the base station, wherein the main reference signal is used for a channel estimation between the user terminal and the base station; and when determining to transmit an additional reference signal to the base station, transmitting an additional reference signal to the base station according to configuration information of the additional reference signal.

According to another aspect of the present disclosure, a user terminal is provided. The user terminal includes: a determining unit configured to determine whether to transmit an additional reference signal to a base station in a communication system according to information on channel conditions of the user terminal; a transmitting unit configured to transmit a main reference signal to the base station, wherein the main reference signal is used for channel estimation between the user terminal and the base station; and when the determining unit determines to transmit an additional reference signal to the base station, the transmitting unit is configured to transmit an additional reference signal to the base station according to configuration information of the additional reference signal.

According to another aspect of the present disclosure, a method for receiving signals performed by a base station in a communication system is provided. The method includes: detecting, from signals from one or more user terminals, reference signals of the respective user terminals, wherein the reference signals include main reference signals and/or additional reference signals; and detecting, from the signals, service data of the respective user terminals according to the detected reference signals.

According to another aspect of the present disclosure, a base station is provided. The base station includes: a detecting unit configured to detect, from signals from one or more user terminals, reference signals of the respective user terminals, wherein the reference signals include main reference signals and/or additional reference signals; and the detecting unit is further configured to detect, from the signals, service data of the respective user terminals according to the detected reference signals.

BRIEF DESCRIPTION OF THE DRAWINGS

The above and other objects, features, and advantages of the present disclosure will become clearer by describing embodiments of the present disclosure in detail with reference to accompanying drawings. The accompanying drawings are used to provide a further understanding of the embodiments of the present disclosure, and constitute a part of the specification, and are used to explain the present disclosure together with the embodiments of the present disclosure, and do not constitute a limitation on the present disclosure. In the accompanying drawings, the same reference numerals generally represent the same components or steps.

DESCRIPTION OF THE EMBODIMENTS

Figure 1:
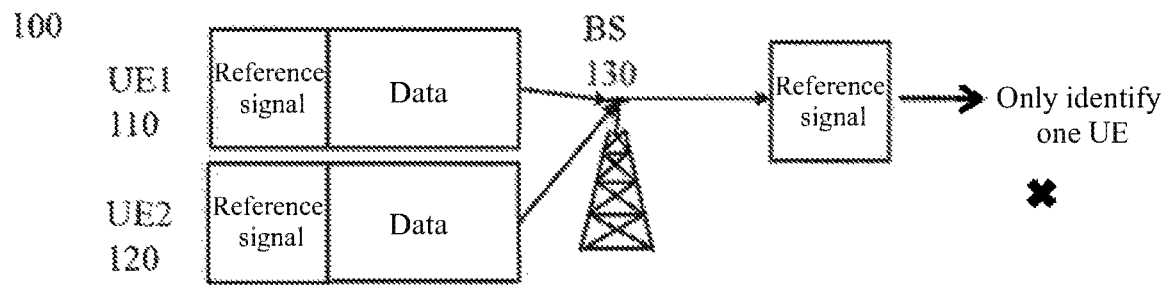
FIG. 1 is a schematic diagram of a wireless communication system in which the embodiments of the present disclosure may be applied.

In order to make objectives, technical solutions, and advantages of the present disclosure clearer, exemplary embodiments according to the present disclosure will be described in detail below with reference to the accompanying drawings. The same reference numerals denote the same elements throughout the accompanying drawings. It should be understood that the embodiments described herein are merely illustrative and should not be constructed as limiting the scope of the disclosure. In addition, the user terminal described herein may include various types of user equipment (UE), such as a mobile terminal (or referred to as mobile station) or a fixed terminal. However, for convenience, the UE and the mobile station are sometimes used interchangeably in the following. In addition, the base station may be a fixed station, a NodeB, an eNodeB (eNB), an access point, a transmitting point, a receiving point, a femto cell, a small cell, and the like, which are not limited herein.

First, a schematic diagram of a wireless communication system in which the embodiments of the present disclosure may be applied is described with reference to FIG. 1. The wireless communication system may be a LTE system, or any other type of wireless communication system, such as a LTE-A system or a 5G system. Hereinafter, the embodiments of the present disclosure are described by using the 5G system as an example, but it should be recognized that the following description may also be applied to other types of wireless communication systems.

As shown in FIG. 1, the wireless communication system 100 may include a first user terminal 110, a second user terminal 120, and a base station (BS) 130. The base station 130 is a serving base station for the first user terminal 110 and the second user terminal 120. Since the number of patterns of uplink reference signals is limited, when the first user terminal 110 and the second user terminal 120 transmit the same reference signal to the base station 130, a collision occurs between the reference signals, resulting in the base station 130 being unable to distinguish the first user terminal 110 and the second user terminal 120 according to the same reference signal. It should be recognized that although one base station and two user terminals are shown in FIG. 1, which is merely schematic, the wireless communication system may further include more base stations, and/or more or fewer user terminals. Therefore, in order to reduce a probability of collisions among reference signals of different user terminals, technical solutions of the present disclosure are proposed.

In the present disclosure, an uplink reference signal may include a main reference signal and/or an additional reference signal used to assist the main reference signal. The main reference signal is a reference signal transmitted by each user terminal to the base station, while the additional reference signal is a reference signal transmitted by each user terminal to the base station as determined according to circumstances. By introducing additional reference signals, the patterns of the uplink reference signals are extended, so that the probability of collisions among the uplink reference signals can be reduced.

Figure 2:
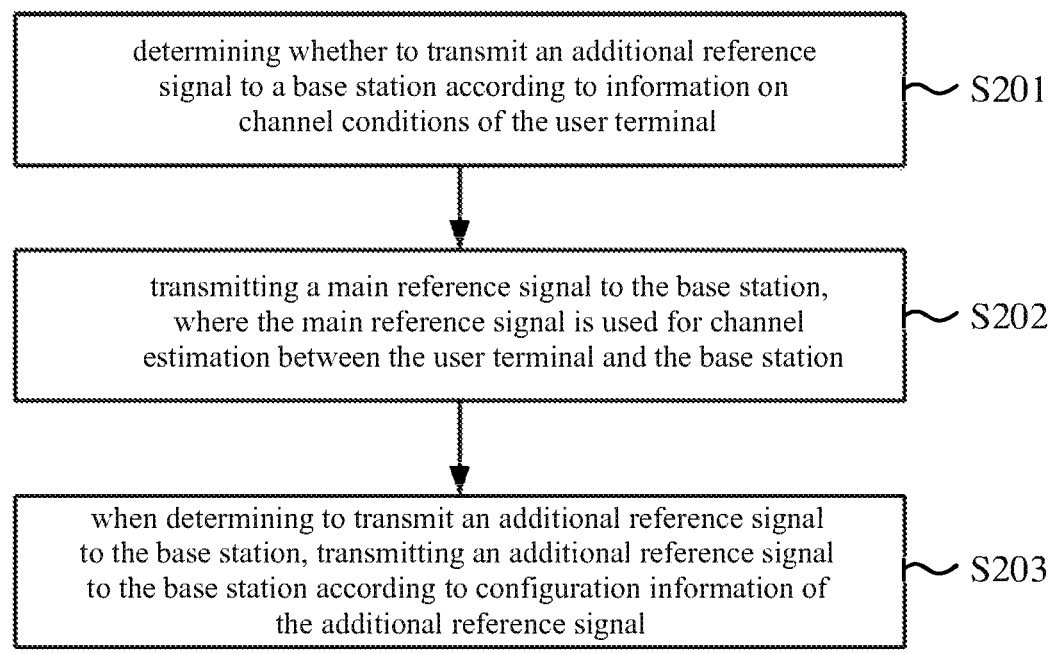
FIG. 2 is a flowchart of a method for transmitting signals performed by a user terminal in the communication system according to one embodiment of the present disclosure.

Hereinafter, a method for transmitting signals performed by the user terminal in the communication system according to the embodiments of the present disclosure will be described with reference to FIG. 2. FIG. 2 is a flowchart of a method 200 for transmitting signals performed by the user terminal in the communication system according to one embodiment of the present disclosure.

According to one example of the present disclosure, the "reference signal" mentioned in the present disclosure may be any uplink reference signal used for channel estimation between the user terminal and the base station, for example, a Demodulation Reference Signal (DMRS), a Sounding Reference Signal (SRS), or the like. In the following example, the embodiments of the present disclosure are described by taking the "reference signal" being the DMRS as an example.

As shown in FIG. 2, in step S201, the user terminal determines whether to transmit an additional reference signal to the base station in the communication system according to information on channel conditions of the user terminal. For example, when the information on the channel conditions of the user terminal indicates that the channel of the user terminal is poor, the user terminal may determine to transmit the additional reference signal to the base station. Conversely, when the information on the channel conditions of the user terminal indicates that the channel of the user terminal is good, the user terminal may determine not to transmit the additional reference signal to the base station. The additional reference signal is a reference signal of the same type as the main reference signal. For example, when the main reference signal is a DMRS, the additional reference signal is an additional DMRS.

The information on the channel conditions of the user terminal may include, for example, dynamic information, which may be obtained by measuring channels of the user terminal. According to one example of the present disclosure, the dynamic information may include signal receiving power information. The signal receiving power information may be, for example, information on a Reference Signal Receiving Power (RSRP). For example, the user terminal may perform a real-time measurement on a downlink reference signal transmitted on a channel to obtain the RSRP. Then, the user terminal may determine whether to transmit the additional reference signal to the base station according to the RSRP.

For example, when the measured RSRP is greater than or equal to a predetermined first threshold about the RSRP, it indicates that the channel conditions of the user terminal are good, and thus the user terminal may determine not to transmit the additional reference signal to the base station. Conversely, when the measured RSRP is less than the predetermined first threshold about the RSRP, it indicates that the channel conditions of the user terminal are poor, and thus the user terminal may determine to transmit the additional reference signal to the base station.

In addition, according to another example of the present disclosure, the dynamic information may further include transmission time advance information. The transmission time advance information may be, for example, information on a Timing Advance (TA). For example, the base station may obtain the TA by performing a real-time measurement on a signal transmitted by the user terminal to the base station via a channel. Then, the base station may notify the user terminal of the measured TA, so that the user terminal determines whether to transmit the additional reference signal to the base station according to the TA.

For example, when the measured TA is greater than or equal to a predetermined second threshold about the TA, it indicates that a distance between the user terminal and the base station is large, that is, the channel conditions of the user terminal are poor, and thus the user terminal may determine to transmit the additional reference signal to the base station. Conversely, when the measured TA is less than the predetermined second threshold about the TA, it indicates that the distance between the user terminal and the base station is small, that is, the channel conditions of the user terminal are good, and thus the user terminal may determine not to transmit the additional reference signal to the base station.

It is described above that the information on the channel conditions of the user terminal in step S201 may include the dynamic information. According to another example of the present disclosure, the information on the channel conditions of the user terminal in step S201 may further include transmission setting information for the user terminal. The transmission setting information for the user terminal may be, for example, initial setting information which is determined by the base station for signal transmission performed by the user terminal, such as the number of times of data retransmission or a correspondence between the number of times of data retransmission and the additional reference signal. Then, the user terminal may determine whether to transmit the additional reference signal to the base station according to the number of times of data retransmission or the correspondence between the number of times of data retransmission and the additional reference signal.

For example, when the number of times of data retransmission is greater than or equal to a predetermined third threshold about the number of times of data retransmission, it indicates that the channel conditions of the user terminal are poor, and thus the user terminal may determine to transmit the additional reference signal to the base station. Conversely, when the number of times of data retransmission is less than the predetermined third threshold about the number of times of data retransmission, it indicates that the channel conditions of the user terminal are good, and thus the user terminal may determine not to transmit the additional reference signal to the base station.

In addition, the transmission setting information for the user terminal may include the correspondence between the number of times of data retransmission and the additional reference signal. For example, when the number of times of retransmission is 3, the additional reference signal corresponding to a first retransmission may be a first additional reference signal, the additional reference signal corresponding to a second retransmission may be a second additional reference signal, the additional reference signal corresponding to a third retransmission may be a third additional reference signal, and a sequence length of the second additional reference signal is greater than a sequence length of the first additional reference signal, and a sequence length of the third additional reference signal is greater than a sequence length of the second additional reference signal.

In addition, according to another example of the present disclosure, the information on the channel conditions of the user terminal in step S201 may further include information indicating a type of the user terminal. The "type of user terminal" here may include a user terminal in the central of the cell and a user terminal on the edge of the cell. User terminals may be divided into the user terminals in the central of the cell and the user terminals on the edge of the cell according to RSRPs of the user terminals, or according to path loss ratios of the user terminals to a serving cell and an interfering cell. When a user terminal is a user terminal in the central of the cell, it indicates that the channel conditions of the user terminal are good, and thus the user terminal may determine not to transmit the additional reference signal to the base station. Conversely, when the user terminal is a user terminal on the edge of the cell, it indicates that the channel conditions of the user terminal are poor, and thus the user terminal may determine to transmit the additional reference signal to the base station.

It should be understood that although in the above example, it is described that the user terminal may determine whether to transmit the additional reference signal to the base station according to one piece of information (one piece of the dynamic information, the transmission setting information, or the type of the user terminal) on its channel conditions. However, the user terminal may also determine whether to transmit the additional reference signal to the base station according to more pieces of information (two or three pieces of the dynamic information, the transmission setting information, or the type of the user terminal) on its channel conditions. For example, when the RSRP of the user terminal is less than the predetermined first threshold about the RSRP and the user terminal is a user terminal in the central of the cell, the user terminal may also determine to transmit the additional reference signal to the base station.

So far, it has been described that the user terminal determines whether to transmit the additional reference signal to the base station according to the information on the channel conditions of the user terminal in step S201. It should be understood that step S201 is that the user terminal determines whether to transmit the additional reference signal to the base station according to its own channel conditions. However, the present disclosure is not limited thereto. According to another example of the present disclosure, the user terminal may further determine whether to transmit the additional reference signal to the base station according to system performance of the communication system. For example, the method 200 may further include: determining, by the user terminal, whether to transmit the additional reference signal to the base station according to predetermined thresholds about system parameters of the communication system. For example, when a system parameter of the communication system satisfies a predetermined threshold about the system parameter, it indicates that the system performance of the communication system is poor, and thus the user terminal may determine to transmit the additional reference signal to the base station. Conversely, when the system parameter of the communication system does not satisfy the predetermined threshold about the system parameter, it indicates that the system performance of the communication system is good, and thus the user terminal may determine not to transmit the additional reference signal to the base station.

In this example, the predetermined thresholds about the system parameter may include one or more of a threshold about system throughput, a threshold about accuracy of channel estimation, a threshold about uniformity of allocating resources according to the number of user terminals, and a threshold about a collision probability of reference signals, and the like. The base station may collect information reported by one or more user terminals to determine the predetermined thresholds about the system parameters, and broadcast the predetermined thresholds about the system parameters to one or more user terminals as system signaling. Correspondingly, the user terminal may obtain the predetermined thresholds about the system parameters by receiving the broadcasted system signaling, so that the user terminal determines whether to transmit the additional reference signal to the base station according to the predetermined thresholds about the system parameters.

In addition, the user terminal may also obtain the system parameters of the communication system from the system signaling from the base station, or may estimate the system parameters of the communication system according to the information on the channel conditions of the user terminal, so that the user terminal determines whether to transmit the additional reference signal to the base station according to the system parameters of the communication system and the predetermined thresholds about the system parameters.

For example, when a system parameter of the communication system exceeds a predefined predetermined threshold about the system parameter, it indicates that the system performance of the communication system is poor, and thus the user terminal may determine to transmit the additional reference signal to the base station. Conversely, when the system parameter of the communication system does not exceed the predefined predetermined threshold about the system parameter, it indicates that the system performance of the communication system is good, and thus the user terminal may determine not to transmit the additional reference signal to the base station. For another example, when a system parameter of the communication system does not exceed a predefined predetermined threshold about the system parameter, it indicates that the system performance of the communication system is poor, and thus the user terminal may determine to transmit the additional reference signal to the base station. Conversely, when the system parameter of the communication system exceeds the predefined predetermined threshold about the system parameter, it indicates that the system performance of the communication system is good, and thus the user terminal may determine not to transmit the additional reference signal to the base station.

In addition, according to another example of the present disclosure, the user terminal may also determine whether to transmit the additional reference signal to the base station according to both its own channel conditions and the system performance of the communication system. For example, the method 200 may further include: determining, by the user terminal, whether to transmit the additional reference signal to the base station according to the information on the channel conditions of the user terminal and the predetermined thresholds about the system parameters of the communication system. For example, when the information on the channel conditions of the user terminal indicates that the channel of the user terminal is poor and/or a system parameter of the communication system satisfies a predetermined threshold about the system parameter, the user terminal may determine to transmit the additional reference signal to the base station. Conversely, when the information on the channel conditions of the user terminal indicates that the channel of the user terminal is good and the system parameter of the communication system does not satisfy the predetermined threshold about the system parameter, the user terminal may determine not to transmit the additional reference signal to the base station.

According to one example of the present disclosure, any one of the foregoing thresholds may be obtained by the base station performing offline calculation, and then notified to the user terminal by the base station. For example, the base station may obtain an optimized value for the best system performance under a predetermined condition through system simulation, and then notify the user terminal of the optimized value. Accordingly, the user terminal uses the optimized value as the threshold.

According to another example of the present disclosure, any one of the above thresholds may be dynamically updated. For example, the base station may measure the system performance of an actual communication system, dynamically update any of the above thresholds according to the measurement results, and notify the user terminal of the updated thresholds. Accordingly, the user terminal updates the previous thresholds by using the updated thresholds. Then, in step S202, the user terminal transmits the main reference signal to the base station, and the main reference signal is used for channel estimation between the user terminal and the base station. In the present disclosure, transmitting the main reference signal to the base station through the user terminal may enable the base station to estimate the channel of the user terminal according to the main reference signal. Alternatively, in the present disclosure, with reference to step S203 to be described below, transmitting the main reference signal and the additional reference signal to the base station through the user terminal may enable the base station to estimate the channel of the user terminal according to the main reference signal and the additional reference signal.

Then, when it is determined to transmit the additional reference signal to the base station, in step S203, the user terminal transmits the additional reference signal to the base station according to configuration information of the additional reference signal. The configuration information of the additional reference signal may include, for example, at least one piece of information on time-frequency resources used when transmitting the additional reference signal, sequence information on the additional reference signal, information on mappings between additional reference signals and main reference signals.

According to one example of the present disclosure, when the configuration information of the additional reference signal in step S203 includes the information on time-frequency resources used when transmitting the additional reference signal, the user terminal may transmit the additional reference signal on the time-frequency resources indicated in the configuration information of the additional reference signal.

According to another example of the present disclosure, when the configuration information of the additional reference signal in step S203 includes the sequence information on the additional reference signal, the user terminal may generate an addition reference signal according to the sequence information indicated in the configuration information of the additional reference signal.

According to another example of the present disclosure, when the configuration information of the additional reference signal in step S203 includes the information on mappings between additional reference signals and main reference signals, the user terminal may generate the additional reference signal according to the information on mappings indicated in the configuration information of the additional reference signal. The "information on mappings" of the present disclosure may be information on pattern mappings between additional reference signals and main reference signals, which may indicate whether the pattern of the additional reference signal and the pattern of the main reference signal correspond one-to-one. For example, the "information on mappings" may indicate that the pattern of the additional reference signal and the pattern of the main reference signal correspond one-to-one, or may also indicate that the pattern of the additional reference signal and the pattern of the main reference signal correspond many-to-one.

According to one example of the present disclosure, when the information on mappings between additional reference signals and main reference signals indicates that the pattern of the additional reference signal and the pattern of the main reference signal correspond one-to-one, the user terminal may obtain the additional reference signal based on the main reference signal, according to the information on mappings between additional reference signals and main reference signals; and transmit the generated additional reference signal to the base station. For example, when the information on mappings between additional reference signals and main reference signals indicates that the pattern of the additional reference signal and the pattern of the main reference signal correspond one-to-one, the additional reference signal may be the same as the main reference signal.

In this example, the Orthogonal Cover Code (OCC) for the user terminal corresponding to its main reference signal and the additional reference signal is different from the orthogonal cover code for another user terminal, so that the reference signals of the two user terminals are orthogonal. For example, the OCC for one user terminal may be [1,1], and the OCC for another user terminal may be [1, −1]. For another example, the OCC for one user terminal may be [1, 1, 1, 1], and the OCC for another user terminal may be [1, 1, −1, −1]. As another example, the OCC for one user terminal may be [1, −1, −1,1], and the OCC for another user terminal may be [1, −1, 1, −1].

The following takes the OCC for one user terminal as [1,1] and the OCC for another user terminal as [1, −1] as an example to describe a process of using the OCC. For example, when the OCC for the first user terminal is [1,1], the sequence of the main reference signal and the sequence of the additional reference signal of the first user terminal are both multiplied by a weighted value of 1; when the OCC for the second user terminal is [1, −1], the sequence of the main reference signal of the second user terminal is multiplied by a weighted value of 1 and the sequence of the additional reference signal of the second user terminal is multiplied by a weighted value of −1.

According to another example of the present disclosure, when the information on mappings between additional reference signals and main reference signals indicates that the pattern of the additional reference signal and the pattern of the main reference signal correspond many-to-one, the user terminal may obtain a plurality of candidate reference signals according to the information on mappings between additional reference signals and main reference signals. For example, a plurality of quasi-orthogonal reference signals may be determined as the plurality of candidate reference signals. The pattern of the additional reference signals or the additional reference signal pool is expanded by introducing the information on mappings between additional reference signals and main reference signals, thereby reducing the probability of collision of the reference signals.

In this example, the user terminal may also select one reference signal from the plurality of candidate reference signals, and transmit the selected reference signal to the base station as the additional reference signal. For example, the user terminal may select one reference signal from the plurality of candidate reference signals as the additional reference signal according to a predetermined rule and transmit it to the base station. As another example, the user terminal may randomly select one reference signal from the plurality of candidate reference signals as the additional reference signal and transmit it to the base station.

In addition, according to another example of the present disclosure, in step S203, the user terminal may transmit the additional reference signal to the base station by using channel resources for transmitting data when the additional reference signal is not transmitted to the base station, according to the configuration information of the additional reference signal. For example, the user terminal may transmit the additional reference signal to the base station by using a physical uplink shared channel according to the configuration information of the additional reference signal. That is, the user terminal may transmit the additional reference signal by using time-frequency resources for transmitting service data.

In addition, the time-frequency resources used by the user terminal to transmit the additional reference signal may overlap with the time-frequency resources used by other user terminals (that have not transmitted additional reference signals) to transmit the service data. For example, when a user terminal on the edge of the cell transmits an additional reference signal to the base station and a user terminal in the central of the cell does not transmit an additional reference signal to the base station, the time-frequency resources used by the user terminal on the edge of the cell to transmit the additional reference signal may overlap with the time-frequency resources used by the user terminal in the central of the cell to transmit service data.

In addition, for the "configuration information of the additional reference signal" and the "predetermined thresholds about the system parameters" described in the above example, the base station may use these two as a rule for the user terminal to use the additional reference signal and broadcast the rule to one or more user terminals in the manner of system signaling. Therefore, according to one example of the present disclosure, the user terminal may obtain the "configuration information of the additional reference signal" and the "predetermined thresholds about the system parameters" by receiving the system signaling, thereby determining whether to transmit the additional reference signal to the base station and determining how to transmit the additional reference signal to the base station when the user terminal has determined to transmit the additional reference signal to the base station.

In addition, it should be recognized that steps S202 and S203 described above may be performed simultaneously or may not be performed simultaneously, which is not limited in this disclosure.

With the method for transmitting the signals performed by the user terminal in the communication system in the embodiment, the user terminal may adaptively transmit the additional reference signal without the base station notifying the user terminal of transmitting the additional reference signal through signaling, which saves signaling overhead and improves resource utilization. In addition, since the user terminal transmits not only the main reference signal but also the additional reference signal to the base station, the patterns of the reference signals are increased, the probability of collision of the reference signals is reduced, and the accuracy of the channel estimation is improved.

Figure 3:
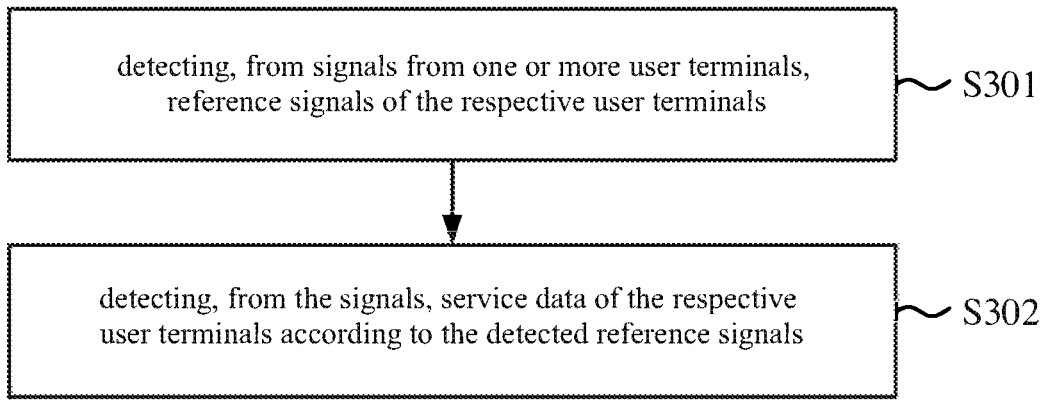
FIG. 3 is a flowchart of a method for receiving signals performed by a base station in the communication system according to one embodiment of the present disclosure.

Hereinafter, a method for receiving signals performed by a base station in a communication system corresponding to the method 200 will be described with reference to FIG. 3. FIG. 3 is a flowchart of a method 300 for receiving signals performed by the base station in the communication system according to one embodiment of the present disclosure. Since some details of the method 300 are the same as the method 200 described above with reference to FIG. 2, a detailed description of the same content is omitted here for simplicity. As shown in FIG. 3, in step S301, the base station detects, from signals from one or more user terminals, reference signals of the respective user terminals, where the reference signals include main reference signals and/or additional reference signals.

According to one example of the present disclosure, the signals received by the base station may include reference signals and service data of the user terminals. When a plurality of user terminals transmit signals to the base station, the base station may receive signals from the plurality of user terminals simultaneously. In this case, the base station needs to detect the reference signals of respective user terminals from the received signals, so as to subsequently detect the service data of respective user terminals from the received signals according to the reference signals of respective user terminals.

According to another example of the present disclosure, in step S301, the base station may firstly detect the main reference signals of respective user terminals, and then detect the additional reference signals of respective user terminals. In this example, when the base station detects the additional reference signals of respective user terminals, the base station may detect respective parts of each additional reference signal, respectively. For example, for each additional reference signal, after detecting a first part of the additional reference signal, the base station may judge whether or not a second part still exists, and if so, continue to detect the second part of the additional reference signal. The base station repeats the operations of judging and detecting until respective parts of the additional reference signal are detected.

According to another example of the present disclosure, before step S301, the method 300 may further include: the base station detecting user information of one or more user terminals from signals from the one or more user terminals. For example, the user terminal may transmit access information to the base station while transmitting the reference signal and the service data to the base station. The access information is, for example, a preamble code (also referred to as a preamble sequence or a random access preamble code). Accordingly, the base station may detect the user information of the user terminal according to the received preamble code. The base station may detect the reference signal corresponding to each user terminal in step S301 by detecting the user information of the user terminal.

According to another example of the present disclosure, after step S301, the method 300 may further include: the base station determining whether or not signals from the plurality of user terminals collide according to the detected reference signals. For example, the base station may judge whether or not power of the additional reference signal and power of the main reference signal are the same for each user terminal, respectively, and when a case that the power of the additional reference signal and the power of the main reference signal of the user terminals are different exists, the base station may determine that the signals from the plurality of user terminals collide.

In this example, when the plurality of user terminals transmit the same main reference signal to the base station, collisions among the main reference signals occur, which results in the base station being unable to distinguish the main reference signals of respective user terminals. Therefore, the main reference signals detected by the base station are a superposition of the main reference signals of the plurality of user terminals. The additional reference signals transmitted by the plurality of user terminals correspond to the user information of respective user terminals. Therefore, the base station may distinguish the additional reference signals of respective user terminals, that is, the base station may detect the additional reference signals of respective user terminals. It can be seen that, with this example, the power of the main reference signals detected by the base station is the sum of the power of the main reference signals of the plurality of user terminals, and the base station may detect the additional reference signals of respective user terminals. Therefore, when the base station judges that the power of the additional reference signal of each user terminal is the same as the power of the main reference signal of the user terminal, it can be determined that the signals from the plurality of user terminals do not collide; and when the base station judges that a case that the power of the additional reference signal and the power of the main reference signal of the user terminals are different exists, it can be determined that signals from the plurality of user terminals collide.

An example of the base station determining whether or not the signals from the plurality of user terminals collide according to the detected reference signals is given below with reference to Table 1. As shown in Table 1, in a first case, when the base station detects the main reference signal of a first user terminal (UE1) and does not detect the additional reference signal of the first user terminal, the power of the main reference signal of the first user terminal is $P_{A1}$ and the power $P_B$ of the additional reference signal of the first user terminal is 0. Since the base station only detects the reference signal of the first user terminal and does not detect the reference signals of other user terminals, the base station may determine that the signals of the user terminals do not collide.

As shown in Table 1, in a second case, when the base station detects the main reference signal and the additional reference signal of the first user terminal (UE1), the power of the main reference signal of the first user terminal is $P_{A1}$ and the power of the additional reference signal of the first user terminal is $P_{B1}$. Since the base station only detects the reference signal of the first user terminal and does not detect the reference signals of other user terminals, $P_{A1}=P_{B1}$, and the base station may determine that the signals of the user terminals do not collide.

As shown in Table 1, in a third case, when the base station detects the main reference signal and the additional reference signal of the first user terminal (UE1), and the main reference signal and the additional reference signal of a second user terminal (UE2), the base station cannot distinguish between the main reference signal of the first user terminal and the main reference signal of the second user terminal. Therefore, the power of the main reference signal of the first user terminal is $(P_{A1}+P_{A2})$ and the power of the additional reference signal of the first user terminal is $P_{B1}$, and the power of the main reference signal of the second user terminal is $(P_{A1}+P_{A2})$ and the power of the additional reference signal of the second user terminal is $P_{B2}$. Since $(P_{A1}+P_{A2}) \neq P_{B1}$ and $(P_{A1}+P_{A2}) \neq P_{B2}$, the base station may determine that the signals of the first user terminal and the second user terminal collide.

As shown in Table 1, in a fourth case, when the base station detects the main reference signal of the first user terminal (UE1) without detecting the additional reference signal of the first user terminal, and detects the main reference signal and the additional reference signal of the second user terminal (UE2), the base station cannot distinguish between the main reference signal of the first user terminal and the main reference signal of the second user terminal. Therefore, the power of the main reference signal of the first user terminal is $(P_{A1}+P_{A2})$ and the power of the additional reference signal of the first user terminal is 0, and the power of the main reference signal of the second user terminal is $(P_{A1}+P_{A2})$, and the power of the additional reference signal of the second user terminal is $P_{B2}$. Since $(P_{A1}+P_{A2})\neq 0$ and $(P_{A1}+P_{A2}) P_{B2}$, the base station may determine that the signals of the first user terminal and the second user terminal collide.

TABLE 1

Example of judging whether or not signals collision occur

| Case | UE | Main reference signal | Power of the main reference signal | Additional reference signal | Power of the additional reference signal | Conclusion |
|---|---|---|---|---|---|---|
| 1 | UE1 | DMRS 1 | $P_{A1}$ | No | 0 | No collision |
| 2 | UE1 | DMRS 1 | $P_{A1}$ | A-DMRS 1 | $P_{B1} = P_{A1}$ | No collision |
| 3 | UE1 | DMRS 1 | $(P_{A1} + P_{A2})$ | A-DMRS 1 | $P_{B1} \neq (P_{A1} + P_{A2})$ | Collision |
|   | UE2 | DMRS 1 |   | A-DMRS 2 | $P_{B2} \neq (P_{A1} + P_{A2})$ |   |
| 4 | UE1 | DMRS 1 | $(P_{A1} + P_{A2})$ | No | 0 | Collision |
|   | UE2 | DMRS 1 |   | A-DMRS 2 | $P_{B2} \neq (P_{A1} + P_{A2})$ |   |

Then, in step S302, the base station detects service data of the respective user terminals from the signals according to the detected reference signals. For example, when signals from the plurality of user terminals do not collide, the base station may detect the service data of the respective user terminals from the received signals.

Figure 4:
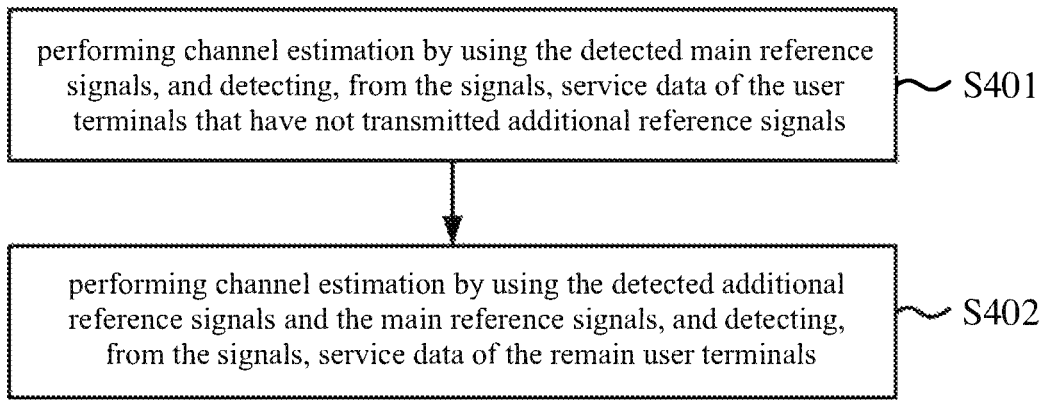
FIG. 4 is a flowchart of a method of the base station detecting service data of respective user terminals from the received signals according to one embodiment of the present disclosure.

The following describes the method in which the base station detects the service data of the respective user terminals from the received signals with reference to FIG. 4. FIG. 4 is a flowchart of a method 400 of the base station detecting the service data of the respective user terminals from the received signals according to one embodiment of the present disclosure. As shown in FIG. 4, in step S401, the base station may perform channel estimation by using the detected main reference signals, and detect, from the received signals, the service data of the user terminals that have not transmitted additional reference signals. In the present disclosure, the base station may perform the channel estimation by using the detected main reference signals to obtain channel estimation information, and then detect, from the received signals, the service data of the user terminals that have not transmitted additional reference signals according to the obtained channel estimation information. In addition, the base station may detect, from the received signals, the service data of the user terminals that have not transmitted additional reference signals by means of successive interference cancellation, and reconstruct and delete the detected data.

Figure 5:
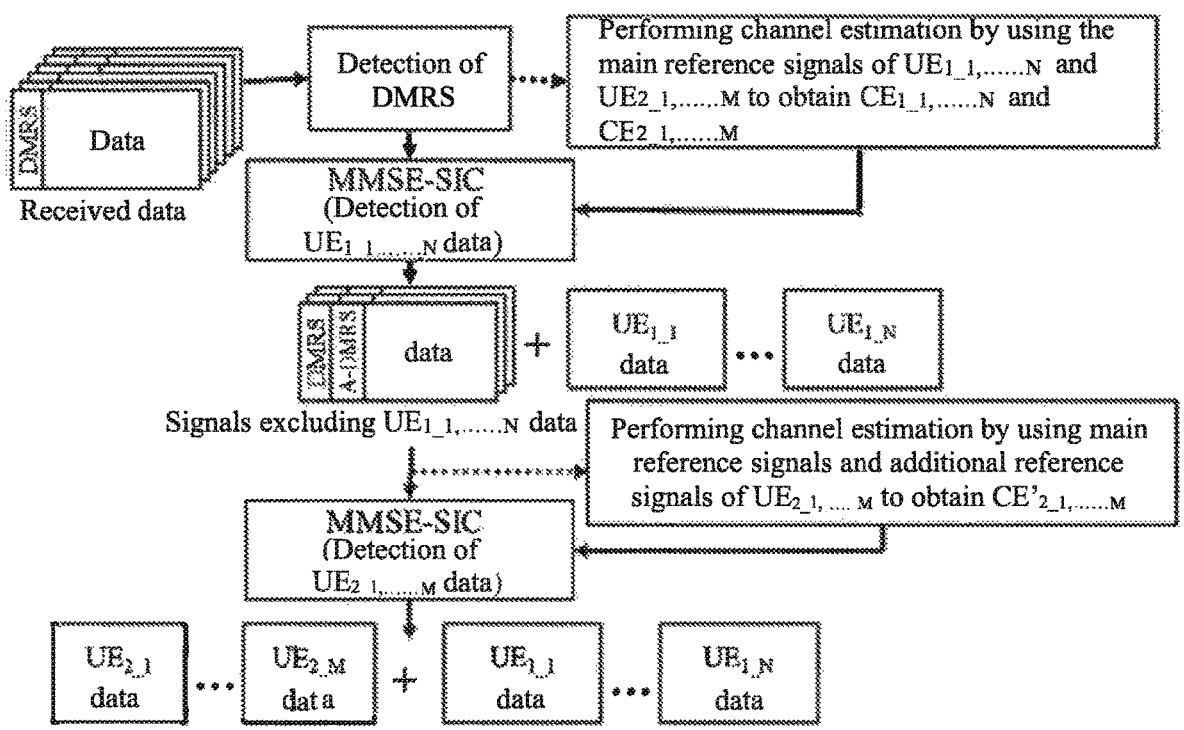
FIG. 5 is a schematic diagram illustrating a process in which the base station detects service data of respective user terminals from the received signals according to the method shown in FIG. 4.

For example, FIG. 5 shows a schematic diagram of a process in which the base station detects the service data of respective user terminals from the received signals according to the method 400. As shown in FIG. 5, the base station receives signals of (N+M) user terminals, and N and M are positive integers. The (N+M) user terminals may include N user terminals $(UE_{1-1} \text{、} \ldots UE_{1-N})$ that do not use the additional reference signals and M user terminals $(UE_{2-1} \text{、} \ldots UE_{2-M})$ that use the additional reference signals.

As shown in FIG. 5, the base station may perform initial channel estimation by using N main reference signals of N user terminals that do not use the additional reference signals and M main reference signals of M user terminals that use the additional reference signals, to obtain N initial channel estimation values and M initial channel estimation values. Then, the base station performs a processing of Minimum Mean Square Error-Successive Interference Cancellation (MMSE-SIC) for the received signals according to the N initial channel estimation values $(CE_{1\_1} \text{、} \ldots CE_{1\_N})$ and M initial channel estimation values $(CE_{2\_1} \text{、} \ldots CE_{2\_M})$, so as to detect the service data of N user terminals that do not use the additional reference signals.

Then, in step S402, the base station may perform channel estimation by using the detected additional reference signals and the main reference signals of the user terminals that have transmitted both an additional reference signal and a main reference signal, and detect, from the received signals, the service data of the user terminals that have transmitted both an additional reference signal and a main reference signal. In the present disclosure, the base station may perform channel estimation by using the detected additional reference signals and the main reference signals of the user terminals that have transmitted both an additional reference signal and a main reference signal to obtain channel estimation information, and then detect, from the received signals, the service data of the user terminals that have transmitted both an additional reference signal and a main reference signal according to the obtained channel estimation information. In addition, the base station may detect, from the received signals, the service data of the user terminals that have transmitted both an additional reference signal and a main reference signal by means of successive interference cancellation, and reconstruct and delete the detected data.

For example, continuing to refer to FIG. 5, as shown in FIG. 5, the base station may perform channel estimation again by using M main reference signals and M additional reference signals of M user terminals that use the additional reference signals, so as to obtain M channel re-estimation values. Then, the base station performs a processing of Minimum Mean Square Error-Successive Interference Cancellation (MMSE-SIC) for the received signals according to the M channel re-estimation values $(CE'_{2\_1} \text{、} \ldots CE'_{2\_M})$, so as to detect the service data of M user terminals that use the additional reference signals.

Figure 6:
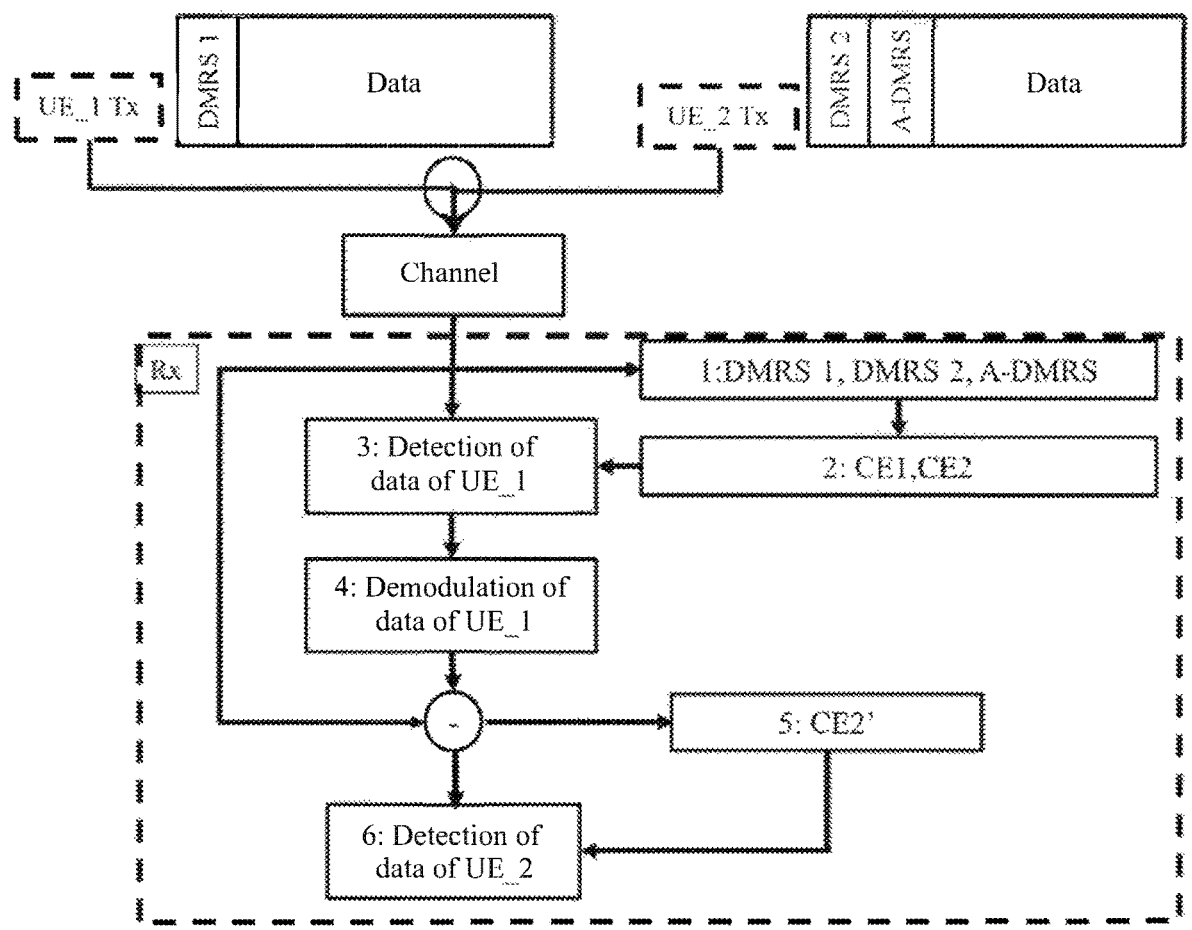
FIG. 6 is a schematic diagram of a process in which the base station detects service data of two user terminals from the received signals according to the method shown in FIG. 4.

With the above steps S401 to S402, the base station detects the service data of respective user terminals from the received signals. The method 400 will be described again with reference to FIG. 6 by taking the signals received by the base station from two user terminals as an example. FIG. 6 is a schematic diagram of a process in which the base station detects the service data of two user terminals from the received signals according to the method 400.

As shown in FIG. 6, a first user terminal (UE_1) is a user terminal that does not use the additional reference signal, and the first user terminal transmits a first main reference signal (DMRS 1) and corresponding service data to the base station. A second user terminal (UE_2) is a user terminal that use the additional reference signal, and the second user terminal transmits a second main reference signal (DMRS 2), an additional reference signal (A-DMRS) and corresponding service data to the base station. Correspondingly, the base station receives signals transmitted by the first user terminal and the second user terminal. It should be noted that the positions of the DMRSs and A-DMRS on time-frequency resources shown in FIG. 6 are merely exemplary. In other examples of the present disclosure, the positions of DMRSs and A-DMRS on the time-frequency resources may be arbitrarily defined.

After receiving the signals transmitted by the first user terminal and the second user terminal, the base station firstly performs the initial channel estimation according to the first main reference signal (DMRS 1) and the second main reference signal (DMRS 2) to obtain the two initial channel estimation values ($CE_1$、$CE_2$). Then, the base station detects the service data of the first user terminal from the received signals according to the two initial channel estimation values ($CE_1$、$CE_2$), and demodulates the service data of the first user terminal to obtain demodulated data.

After detecting the service data of the first user terminal, the base station may perform channel estimation again according to the second main reference signal (DMRS 2) and the additional reference signal (A-DMRS) to obtain a channel re-estimation value ($CE'_2$). Then, the base station detects the service data of the second user terminal from the received signals according to the channel re-estimation value ($CE'_2$). Similarly, the base station may also demodulate the service data of the second user terminal to obtain demodulated data (not shown in the figure).

With the method for receiving signals performed by the base station in the communication system in the embodiment, the base station does not need to notify the user terminal of transmitting the additional reference signals through signaling, which saves signaling overhead and improves resource utilization. In addition, since the base station receives not only the main reference signal, but also the additional reference signal from the user terminal, the patterns of the reference signals are increased, the probability of collision of the reference signals is reduced, and the accuracy of the channel estimation is improved.

Figure 7:
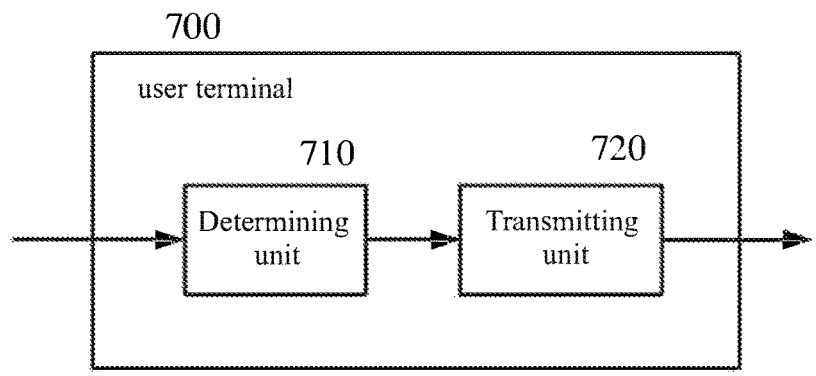
FIG. 7 is a schematic structural diagram of the user terminal that performs the method shown in FIG. 2 according to one embodiment of the present disclosure.

Hereinafter, a user terminal performing the method 200 according to one embodiment of the present disclosure will be described with reference to FIG. 7. FIG. 7 is a schematic structural diagram of a user terminal 700 according to one embodiment of the present disclosure. Since the function of the user terminal 700 is the same as the details of the method described above with reference to FIG. 2, a detailed description of the same content is omitted here for simplicity. As shown in FIG. 7, the user terminal 700 includes: a determining unit 710 configured to determine whether to transmit an additional reference signal to a base station in a communication system according to information on channel conditions of the user terminal; and a transmitting unit 720 configured to transmit a main reference signal to the base station, and the main reference signal is used for a channel estimation between the user terminal and the base station; and when the determining unit 710 determines to transmit the additional reference signal to the base station, the transmitting unit 720 is configured to transmit the additional reference signal to the base station according to configuration information of the additional reference signal. In addition to these two units, the user terminal 700 may include other components. However, since these components are not related to the content of the embodiments of the present disclosure, their illustration and description are omitted here.

The determining unit 710 determines whether to transmit the additional reference signal to the base station according to information on channel conditions of the user terminal. For example, when the information on the channel conditions of the user terminal indicates that the channel of the user terminal is poor, the determining unit 710 may determine to transmit the additional reference signal to the base station. Conversely, when the information on the channel conditions of the user terminal indicates that the channel of the user terminal is good, the determining unit 710 may determine not to transmit the additional reference signal to the base station.

The information on the channel conditions of the user terminal may include, for example, dynamic information, which may be obtained by measuring a channel of the user terminal. According to one example of the present disclosure, the dynamic information may include signal receiving power information. The signal receiving power information may be, for example, information on a Reference Signal Receiving Power (RSRP). For example, the user terminal may perform a real-time measurement on a downlink reference signal transmitted on a channel to obtain the RSRP. Then, the determining unit 710 may determine whether to transmit the additional reference signal to the base station according to the RSRP.

In addition, according to another example of the present disclosure, the dynamic information may further include transmission time advance information. The transmission time advance information may be, for example, information on a Timing Advance (TA). For example, the base station may obtain the TA by performing real-time measurement on a signal transmitted by the user terminal to the base station via a channel. Then, the base station may notify the user terminal of the measured TA, so that the determining unit 710 determines whether to transmit the additional reference signal to the base station according to the TA.

According to another example of the present disclosure, the information on the channel conditions of the user terminal may further include the transmission setting information for the user terminal. The transmission setting information for the user terminal may be, for example, initial setting information determined by the base station for signal transmission by the user terminal, such as the number of times of data retransmission or a correspondence between the number of times of data retransmission and the additional reference signal. Then, the determining unit 710 may determine whether to transmit the additional reference signal to the base station according to the number of times of data retransmission or the correspondence between the number of times of data retransmission and the additional reference signal.

In addition, according to another example of the present disclosure, the information on the channel conditions of the user terminal may further include a type of the user terminal. When the user terminal is a user terminal in the central of the cell, it indicates that the channel conditions of the user terminal are good, and thus the determining unit 710 may determine not to transmit the additional reference signal to the base station. Conversely, when the user terminal is a user terminal on the edge of the cell, it indicates that the channel conditions of the user terminal are poor, and thus the determining unit 710 may determine to transmit the additional reference signal to the base station.

So far, it has been described that the determination unit 710 determines whether to transmit the additional reference signal to the base station according to the information on the channel conditions of the user terminal. It should be understood that the above describes that the determining unit 710 determines whether to transmit the additional reference signal to the base station according to its own channel conditions. However, the present disclosure is not limited thereto. According to another example of the present disclosure, the determining unit 710 may further determine whether to transmit the additional reference signal to the base station according to system performance of the communication system. For example, the determining unit 710 determines whether to transmit the additional reference signal to the base station according to predetermined thresholds about system parameters of the communication system. For example, when a system parameter of the communication system satisfies a predetermined threshold about the system parameter, it indicates that the system performance of the communication system is poor, and thus the determining unit 710 may determine to transmit the additional reference signal to the base station. Conversely, when the system parameter of the communication system does not satisfy the predetermined threshold about the system parameter, it indicates that the system performance of the communication system is good, and thus the determining unit 710 may determine not to transmit the additional reference signal to the base station.

In this example, the predetermined thresholds about the system parameter may include one or more of a threshold about system throughput, a threshold about accuracy of channel estimation, a threshold about uniformity of allocating resources according to the number of user terminals, and a threshold about a collision probability of reference signals, and the like. The base station may collect information reported by one or more user terminals to determine the predetermined thresholds about the system parameters, and broadcast the predetermined thresholds about the system parameters to one or more user terminals as system signaling. Correspondingly, the user terminal may obtain the predetermined thresholds about the system parameters by receiving the broadcasted system signaling, so that the user terminal determines whether to transmit the additional reference signal to the base station according to the predetermined thresholds about the system parameters.

In addition, the user terminal may also obtain the system parameters of the communication system from the system signaling from the base station, or may estimate the system parameters of the communication system according to the information on the channel conditions of the user terminal, so that the determining unit 710 determines whether to transmit the additional reference signal to the base station according to the system parameters of the communication system and the predetermined thresholds about the system parameters.

In addition, according to another example of the present disclosure, the determining unit 710 may also determine whether to transmit the additional reference signal to the base station according to both its own channel conditions and the system performance of the communication system. For example, the determining unit 710 determines whether to transmit the additional reference signal to the base station according to the information on the channel conditions of the user terminal and the predetermined thresholds about the system parameters of the communication system. For example, when the information on the channel conditions of the user terminal indicates that the channel of the user terminal is poor and a system parameter of the communication system satisfies a predetermined threshold about the system parameter, the determining unit 710 may determine to transmit the additional reference signal to the base station.

Conversely, when the information on the channel conditions of the user terminal indicates that the channel of the user terminal is good and the system parameter of the communication system does not satisfy the predetermined threshold about the system parameter, the determining unit 710 may determine not to transmit the additional reference signal to the base station.

The configuration information of the additional reference signal may include, for example, at least one piece of information on time-frequency resources used when transmitting the additional reference signal, sequence information on the additional reference signal, information on mappings between additional reference signals and main reference signals.

According to one example of the present disclosure, when the information on mappings between additional reference signals and main reference signals indicates that the pattern of the additional reference signal and the pattern of the main reference signal correspond one-to-one, the transmitting unit 720 may obtain the additional reference signal based on the main reference signal, according to the information on mappings between additional reference signals and main reference signals; and transmit the generated additional reference signal to the base station. For example, when the information on mappings between additional reference signals and main reference signals indicates that the pattern of the additional reference signal and the pattern of the main reference signal correspond one-to-one, the additional reference signal may be the same as the main reference signal.

According to another example of the present disclosure, when the information on mappings between additional reference signals and main reference signals indicates that the pattern of the additional reference signal and the pattern of the main reference signal correspond many-to-one, the transmitting unit 720 may obtain a plurality of candidate reference signals according to the information on mappings between additional reference signals and main reference signals. For example, a plurality of quasi-orthogonal reference signals may be determined as the plurality of candidate reference signals. The pattern of the additional reference signals or the additional reference signal pool is expanded by introducing the information on mappings between additional reference signals and main reference signals, thereby reducing the probability of collision of the reference signals.

In this example, the transmitting unit 720 may also select one reference signal from the plurality of candidate reference signals, and transmit the selected reference signal to the base station as the additional reference signal. For example, the transmitting unit 720 may select one reference signal from the plurality of candidate reference signals as the additional reference signal according to a predetermined rule and transmit it to the base station. As another example, the transmitting unit 720 may randomly select one reference signal from the plurality of candidate reference signals as the additional reference signal and transmit it to the base station.

In addition, according to another example of the present disclosure, the transmitting unit 720 may transmit the additional reference signal to the base station by using channel resources for transmitting data when the additional reference signal is not transmitted to the base station, according to the configuration information of the additional reference signal. For example, the transmitting unit 720 may transmit the additional reference signal to the base station by using a physical uplink shared channel according to the configuration information of the additional reference signal. That is, the transmitting unit 720 may transmit the additional reference signal by using time-frequency resources for transmitting service data.

In addition, the time-frequency resources used by the transmitting unit 720 to transmit the additional reference signal may overlap with the time-frequency resources used by other user terminals (that have not transmitted additional reference signals) to transmit the service data. For example, when a user terminal on the edge of the cell transmits an additional reference signal to the base station and a user terminal in the central of the cell does not transmit an additional reference signal to the base station, the time-frequency resources used by the user terminal on the edge of the cell to transmit the additional reference signal may overlap with the time-frequency resources used by the user terminal in the central of the cell to transmit service data.

The user terminal according to the embodiment may adaptively transmit the additional reference signal without the base station notifying the user terminal of transmitting the additional reference signal though signaling, which saves signaling overhead and improves resource utilization. In addition, since the user terminal transmits not only the main reference signal but also the additional reference signal to the base station, the patterns of the reference signals are increased, the probability of collision of the reference signals is reduced, and the accuracy of the channel estimation is improved.

Figure 8:
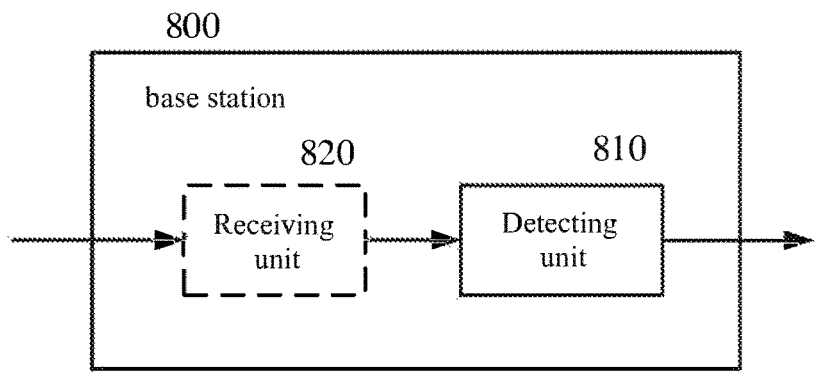
FIG. 8 is a schematic structural diagram of the base station that performs the method shown in FIG. 3 according to one embodiment of the present disclosure.

Hereinafter, a base station performing the method 300 according to one embodiment of the present disclosure will be described with reference to FIG. 8. FIG. 8 is a schematic structural diagram illustrating a base station 800 according to one embodiment of the present disclosure. Since the function of the base station 800 is the same as the details of the method described above with reference to FIGS. 3-5, a detailed description of the same content is omitted here for simplicity. As shown in FIG. 8, the base station 800 includes a detecting unit 810 configured to detect, from signals from one or more user terminals, reference signals of respective user terminals, where the reference signals include main reference signals and/or additional reference signals; and the detecting unit 810 is further configured to detect, from the signals, service data of the respective user terminals, according to the detected reference signals. In addition to these units, the base station 800 may include other components. However, since these components are not related to the content of the embodiments of the present disclosure, their illustration and description are omitted here.

According to one example of the present disclosure, the base station 800 may further include a receiving unit 820 configured to receive the signals from the user terminals, such as reference signals and service data of the user terminals. When a plurality of user terminals transmit signals to the base station, the receiving unit 820 may receive signals from the plurality of user terminals simultaneously. In this case, the detecting unit 810 needs to detect the reference signals of respective user terminals from the received signals, so as to subsequently detect the service data of respective user terminals from the received signals according to the reference signals of respective user terminals.

According to another example of the present disclosure, the detecting unit 810 may first detect the main reference signals of respective user terminals, and then detect the additional reference signals of respective user terminals. In this example, when the detecting unit 810 detects the additional reference signals of respective user terminals, the detecting unit 810 may detect respective parts of each additional reference signal, respectively. For example, for each additional reference signal, after detecting a first part of the additional reference signal, the detecting unit 810 may judge whether or not a second part still exists, and if so, continue to detect the second part of the additional reference signal. The detecting unit 810 repeats the operations of judging and detecting until respective parts of the additional reference signal are detected.

According to another example of the present disclosure, the detecting unit 810 may detect user information of one or more user terminals from signals from the one or more user terminals. For example, the user terminal may transmit access information to the base station while transmitting the reference signal and the service data to the base station. The access information is, for example, a preamble code (also referred to as a preamble sequence or a random access preamble code). Accordingly, the base station may detect the user information of the user terminal according to the received preamble code. The detecting unit 810 may detect the reference signal corresponding to each user terminal by detecting the user information of the user terminal.

According to another example of the present disclosure, the detecting unit 810 may determine whether or not signals from the plurality of user terminals collide according to the detected reference signals. For example, the detecting unit 810 may judge whether or not power of the additional reference signal and power of the main reference signal are the same for each user terminal, respectively, and when a case that the power of the additional reference signal and the power of the main reference signal of the user terminals are different exists, the detecting unit 810 may determine that the signals from the plurality of user terminals collide.

In this example, when the plurality of user terminals transmit the same main reference signal to the base station, collisions among the main reference signals occur, which results in the base station being unable to distinguish the main reference signals of respective user terminals. Therefore, the main reference signals detected by the base station are a superposition of the main reference signals of the plurality of user terminals. The additional reference signals transmitted by the plurality of user terminals correspond to the user information of respective user terminals. Therefore, the base station may distinguish the additional reference signals of respective user terminals, that is, the base station may detect the additional reference signals of respective user terminals. It can be seen that, with this example, the power of the main reference signals detected by the base station is the sum of the power of the main reference signals of the plurality of user terminals, and the base station may detect the additional reference signals of respective user terminals. Therefore, when the base station judges that the power of the additional reference signal of each user terminal is the same as the power of the main reference signal of the user terminal, it can be determined that the signals from the plurality of user terminals do not collide; and when the base station judges that a case that the power of the additional reference signal and the power of the main reference signal of the user terminals are different exists, it can be determined that signals from the plurality of user terminals collide.

Then, the detecting unit 810 detects service data of the respective user terminals from the signals according to the detected reference signals. For example, when signals from the plurality of user terminals do not collide, the detecting unit 810 may detect the service data of the respective user terminals from the received signals.

The detecting unit 810 may perform channel estimation by using the detected main reference signals, and detect, from the received signals, the service data of the user terminals that have not transmitted additional reference signals. In the present disclosure, the detecting unit 810 may perform the channel estimation by using the detected main reference signals to obtain channel estimation information, and then detect, from the received signals, the service data of the user terminals that have not transmitted additional reference signals according to the obtained channel estimation information. In addition, the detecting unit 810 may detect, from the received signals, the service data of the user terminals that have not transmitted additional reference signals by means of successive interference cancellation, and reconstruct and delete the detected data.

Then, the detecting unit 810 may perform channel estimation by using the detected additional reference signals and the main reference signals of the user terminals that have transmitted both an additional reference signal and a main reference signal, and detect, from the received signals, the service data of the user terminals that have transmitted both an additional reference signal and a main reference signal. In the present disclosure, the detecting unit 810 may perform channel estimation by using the detected additional reference signals and the main reference signals of the user terminals that have transmitted both an additional reference signal and a main reference signal to obtain channel estimation information, and then detect, from the received signals, the service data of the user terminals that have transmitted both an additional reference signal and a main reference signal according to the obtained channel estimation information. In addition, the detecting unit 810 may detect, from the received signals, the service data of the user terminals that have transmitted both an additional reference signal and a main reference signal by means of successive interference cancellation, and reconstruct and delete the detected data.

With the base station according to the embodiment, there is no need to notify the user terminal of transmitting the additional reference signals through signaling, which saves signaling overhead and improves resource utilization. In addition, since the base station receives not only the main reference signal, but also the additional reference signal from the user terminal, the patterns of the reference signal are increased, the probability of collision of the reference signals is reduced, and the accuracy of the channel estimation is improved.

<Hardware>

It should be noted that block diagrams used for the illustration of the above embodiments represent blocks in functions. These functional blocks (structural units) may be realized by any combination of hardware and/or software. In addition, the means for implementing respective functional blocks is not particularly limited. That is, respective functional blocks may be realized by one apparatus that is physically and/or logically aggregated, or may be realized by directly and/or indirectly (for example, wired and/or wireless) connecting two or more physically and/or logically separate apparatuses and using the plurality of apparatuses.

Figure 9:
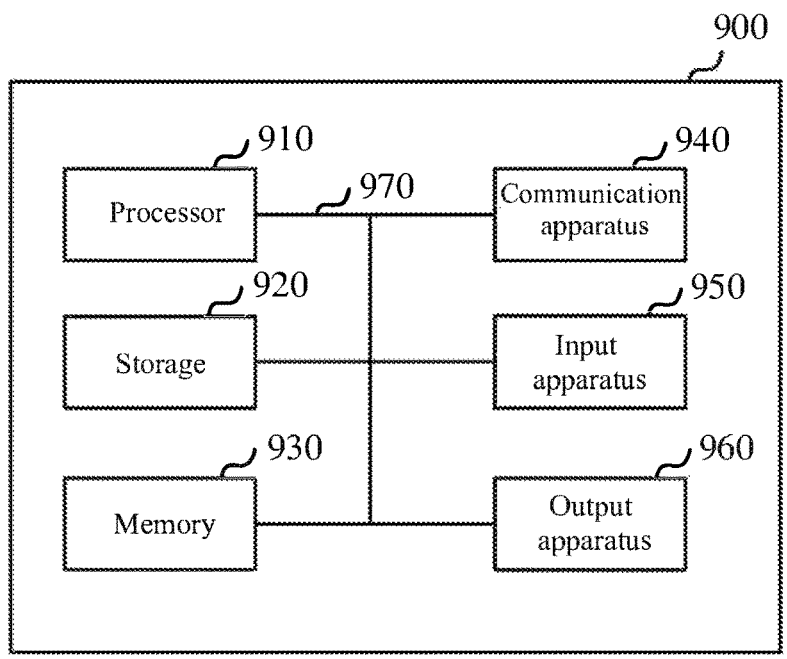
FIG. 9 is a schematic diagram of a hardware structure of the related user terminal or related base station according to the embodiments of the present disclosure.

For example, the device (such as the first communication device, the second communication device, or a flying user terminal, etc.) in one embodiment of the present disclosure can function as a computer that executes processing of the wireless communication method of the present disclosure. FIG. 9 is a schematic diagram of a hardware structure of related device 900 (the base station or the user terminal) according to the embodiments of the present disclosure. The above described device 900 (base station or user terminal) may be physically designed as a computer apparatus including a processor 910, a storage 920, a memory 930, a communication apparatus 940, an input apparatus 950, an output apparatus 960, and a bus 970 and the like.

It should be noted that, in the following description, the word "apparatus" may be replaced by "circuit", "device", "unit" and so on. It should be noted that the hardware structure of a user terminal 700 and a base station 800 may be designed to include one or more of each apparatus shown in the drawings, or may be designed not to include part of the apparatus.

For example, although only one processor 910 is shown, a plurality of processors may be provided. Furthermore, processes may be implemented with one processor, or processes may be implemented either simultaneously or in sequence, or in different manners, on two or more processors. It should be noted that the processor 910 may be implemented with one or more chips.

Each function of the device 900 is implemented by reading predetermined software (program) on hardware such as the processor 910 and the memory 920, so as to make the processor 910 perform calculations, and by controlling the communication carried out by the communication apparatus 940, and the reading and/or writing of data in the memory 920 and the storage 930.

The processor 910 may control the whole computer by, for example, running an operating system. The processor 910 may be configured with a central processing unit (CPU), which includes interfaces with peripheral apparatus, control apparatus, computing apparatus, a register and so on. For example, the foregoing determining unit, adjusting unit, and the like may be implemented by the processor 910.

Furthermore, the processor 910 reads programs (program codes), software modules or data, from the storage 930 and/or the communication apparatus 940, into the memory 920, and executes various processes according to these. As for the programs, programs to allow computers to execute at least part of the operations of the above-described embodiments may be used. For example, the determining unit of user equipment 500 may be implemented by a control program stored in the memory 920 and operated by the processor 910, and may also be implemented similarly for other function blocks.

The memory 920 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 920 may be referred to as a "register", a "cache", a "main memory" (primary storage apparatus) and so on. The memory 920 can store executable programs (program codes), software modules and so on for implementing the methods according to embodiments of the present disclosure.

The storage 930 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 930 may be referred to as "secondary storage apparatus."

The communication apparatus 940 is hardware (transmitting/receiving device) for allowing inter-computer communication by using wired and/or wireless networks, and may be referred to as, for example, a "network device", a "network controller", a "network card", a "communication module" and so on. The communication apparatus 940 may be configured to include a high frequency switch, a duplexer, a filter, a frequency synthesizer and so on in order to realize, for example, frequency division duplex (FDD) and/or time division duplex (TDD). For example, the above described transmitting unit, receiving unit, etc. may be implemented by the communication apparatus 940.

The input apparatus 950 is an input device for receiving input from the outside (for example, a keyboard, a mouse, a microphone, a switch, a button, a sensor and so on). The output apparatus 960 is an output device for allowing sending output to the outside (for example, a display, a speaker, an LED (Light Emitting Diode) lamp and so on). It should be noted that the input apparatus 950 and the output apparatus 960 may be provided in an integrated structure (for example, a touch panel).

Furthermore, these pieces of apparatus, including the processor 910, the memory 920 and so on are connected by the bus 970 so as to communicate information. The bus 970 may be formed with a single bus, or may be formed with buses that vary between pieces of apparatus.

Also, the base station 800 and the user equipment 700 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 910 may be installed with at least one of these pieces of hardware.

<Variation>

In addition, it should be noted that the terms illustrated in the present specification and/or the terms required for the understanding of the present specification may be substituted with terms having the same or similar meaning. For example, a channel and/or a symbol may be a signal. In addition, the signal may be a message. A reference signal may be abbreviated as an "RS (Reference Signal)", and may be referred to as a "pilot", a "pilot signal" and so on, depending on which standard applies. In addition, a component carrier (CC) may be referred to as a carrier frequency, a cell, or the like.

Also, the information and parameters and so on described in this specification may be represented in absolute values or in relative values with respect to predetermined values, or may be represented in corresponding other information. For example, radio resources may be indicated by predetermined indices. In addition, equations to use these parameters and so on may be used, apart from those explicitly disclosed in this specification.

The names used for parameters and so on in this specification are not limited in any respect. For example, since various channels (PUCCH (Physical Uplink Control Channel), PDCCH (Physical Downlink Control Channel) and so on) and information elements can be identified by any suitable names, the various names assigned to these various channels and information elements are not limited in any respect.

The information, signals and so on described in this specification may be represented by using any one of various different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on that are input and/or output may be overwritten, updated or appended. The information, signals and so on that are output may be deleted. The information, signals and so on that are input may be transmitted to other apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBS) and so on), MAC (Medium Access Control) signaling and so on), and other signals and/or combinations of these.

It should be noted that physical layer signaling may also be referred to as L1/L2 (Layer 1/Layer 2) control information (L1/L2 control signals), L1 control information (L1 control signal) and so on. Also, RRC signaling may be referred to as "RRC messages", and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, a reporting "X") does not necessarily have to be carried out explicitly, and can be carried out implicitly (by, for example, not reporting this piece of information, or by reporting a different piece of information).

Regarding decisions, which may be made in values represented by one bit (0 or 1), may be made by a true or false value (Boolean value) represented by true or false, or may be made by comparing numerical values (for example, comparison against a predetermined value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are included in the definition of communication media.

The terms "system" and "network" as used herein are used interchangeably.

In the present specification, the terms "base station (BS)", "radio base station", "eNB", "gNB", "cell", "sector", "cell group", "carrier" and "component carrier" may be used interchangeably. A base station may be referred to as a "fixed station", "NodeB", "eNodeB (eNB)", "access point", "transmission point", "receiving point", "femto cell", "small cell" and so on.

A base station can accommodate one or more (for example, three) cells (also referred to as "sectors"). When a base station accommodates a plurality of cells, the entire coverage area of the base station can be partitioned into a plurality of smaller areas, and each smaller area can provide communication services with base station subsystems (for example, indoor small base stations (RRHs (Remote Radio Heads))). The term "cell" or "sector" refers to part or all of the coverage area of a base station and/or a base station subsystem that provides communication services within this coverage.

In the present specification, the terms "mobile station (MS)", "user terminal", "user equipment (UE)" and "terminal" may be used interchangeably. A mobile station is also sometimes used by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

Furthermore, the radio base stations in this specification may be interpreted as user terminals. For example, each aspect/embodiment of the present disclosure may be applied to a configuration in which communication between a radio base station and a user terminal is replaced with communication among a plurality of user terminals (D2D (Device-to-Device)). In this case, the first communication device or the second communication device in device 900 described above may have the functions of the user terminal. In addition, terms such as "uplink" and "downlink" may be interpreted as "side." For example, an uplink channel may be interpreted as a side channel.

Likewise, the user terminals in this specification may be interpreted as radio base stations. In this case, the first communication device or the second communication device may have the functions of the user terminals described above.

In the present specification, it is assumed that certain actions to be performed by base station may, in some cases, be performed by its higher node (upper node). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The respective aspects/embodiments illustrated in this specification may be used individually or in combinations, which may also be switched and used during execution. The order of processes, sequences, flowcharts and so on of the respective aspects/embodiments described in the present specification may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 3000 (Code Division Multiple Access), UMB (Ultra Mobile Broadband), IEEE 920.11 (Wi-Fi (registered trademark)), IEEE 920.16 (WiMAX (registered trademark)), IEEE 920.20, UWB (Ultra-WideBand), Bluetooth (registered trademark) and other adequate radio communication methods, and/or next-generation systems that are enhanced based on these.

The phrase "based on" as used in this specification does not mean "based only on", unless otherwise specified. In other words, the phrase "based on" means both "based only on" and "based at least on."

Any reference to elements with designations such as "first", "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "including", "comprising" and variations of these are used in this specification or in claims, these terms are intended to be inclusive, in a manner similar to the way the term "provide" is used. Furthermore, the term "or" as used in this specification or in claims is intended to be not an exclusive disjunction.

Although the present disclosure has been described in detail above, it should be obvious to a person skilled in the art that the present disclosure is by no means limited to the embodiments described herein. The present disclosure can be implemented with various corrections and in various modifications, without departing from the spirit and scope of the present disclosure defined by the recitations of claims. Consequently, the description herein is provided only for the purpose of explaining examples, and should by no means be construed to limit the present disclosure in any way.

What is claimed is:

1. A method performed by a terminal in a communication system, the method comprising:
determining whether to transmit an additional reference signal to a base station in the communication system according to information on channel conditions of the terminal;
transmitting a main reference signal to the base station, wherein the main reference signal is used for channel estimation between the terminal and the base station; and
when determining to transmit an additional reference signal to the base station, transmitting an additional reference signal to the base station according to configuration information of the additional reference signal, wherein the configuration information includes the information on mappings between additional reference signals and main reference signals.

2. The method according to claim 1, wherein the information on channel conditions of the terminal includes dynamic information, the dynamic information being obtained by measuring a channel.

3. The method according to claim 2, wherein the dynamic information includes signal receiving power information and/or transmission time advance information for the terminal.

4. The method according to claim 1, wherein the information on channel conditions of the terminal includes transmission setting information for the terminal.

5. A terminal, comprising:
a determining unit configured to determine whether to transmit an additional reference signal to a base station in a communication system according to information on channel conditions of the terminal;
a transmitting unit configured to transmit a main reference signal to the base station, wherein the main reference signal is used for channel estimation between the terminal and the base station; and
when the determining unit determines to transmit an additional reference signal to the base station, the transmitting unit is configured to transmit an additional reference signal to the base station according to configuration information of the additional reference signal, wherein the configuration information includes the information on mappings between additional reference signals and main reference signals.

6. A base station comprising:
a detecting unit configured to detect, from signals from one or more terminals, reference signals of the respective terminals, wherein the reference signals include main reference signals and/or additional reference signals, wherein the configuration information includes the information on mappings between additional reference signals and main reference signals; and
the detecting unit is further configured to detect, from the signals, service data of the respective terminals, according to the detected reference signals.

7. The terminal according to claim 5, wherein the information on channel conditions of the terminal includes dynamic information, the dynamic information being obtained by measuring a channel.

8. The terminal according to claim 7, wherein the dynamic information includes signal receiving power information and/or transmission time advance information for the terminal.

9. The terminal according to claim 5, wherein the information on channel conditions of the terminal includes transmission setting information for the terminal.

10. The terminal according to claim 9, wherein the transmission setting information includes the number of times of data retransmission or a correspondence between the number of times of data retransmission and the additional reference signal.

11. The terminal according to claim 5, wherein the information on channel conditions of the terminal includes information indicating a type of the terminal.

12. The terminal according to claim 5, wherein the configuration information of the additional reference signal further includes at least one piece of information on time-frequency resources used when transmitting the additional reference signal, sequence information on the additional reference signal.

13. The terminal according to claim 5, wherein
the transmitting unit is configured to obtain the additional reference signal based on the main reference signal, according to the information on mappings between additional reference signals and main reference signals, and transmit the generated additional reference signal to the base station.

14. The terminal according to claim 5, wherein
the transmitting unit is configured to obtain a plurality of candidate reference signals according to the information on mappings between additional reference signals and main reference signals, and select one reference signal from the plurality of candidate reference signals and transmit the selected reference signal to the base station as the additional reference signal.

15. The terminal according to claim 5, wherein the determining unit is further configured to determine whether to transmit an additional reference signal to the base station in the communication system according to predetermined thresholds about system parameters of the communication system.

16. The terminal according to claim 5, wherein the transmitting unit is configured to transmit an additional reference signal to the base station by using channel resources for transmitting data when the additional reference signal is not transmitted to the base station, according to the configuration information of the additional reference signal.

17. The base station according to claim 6, wherein the detecting unit is further configured to determine whether or not signals from a plurality of terminals collide according to the detected reference signals;
wherein the detecting unit is configured to detect the service data of the respective terminals from the signals when the signals from the plurality of terminals do not collide.

18. The base station according to claim 17, wherein the detecting unit is configured to judge whether or not power of the additional reference signal and power of the main reference signal are the same for each terminal, respectively, and determine that the signals from the plurality of terminals collide when a case that the power of the additional reference signal and the power of the main reference signal of the terminals are different exists.

19. The base station according to claim 6, wherein the detecting unit is configured to perform channel estimation by using the detected main reference signals, and detect, from the signals, service data of the terminals that have not transmitted additional reference signals; and perform channel estimation by using the detected additional reference signals and the main reference signals of the terminals that have transmitted both an additional reference signal and a main reference signal, and detect, from the signals, service data of the terminals that have transmitted both an additional reference signal and a main reference signal.

20. The base station according to claim 19, wherein the detecting unit is configured to detect, from the signals, service data of the terminals that have not transmitted additional reference signals by means of successive interference cancellation, and reconstruct and delete the detected data; and detect, from the signals, service data of the terminals that have transmitted both an additional reference signal and a main reference signal, by means of successive interference cancellation, and reconstruct and delete the detected data.

* * * * *